United States Patent Office 3,766,222
Patented Oct. 16, 1973

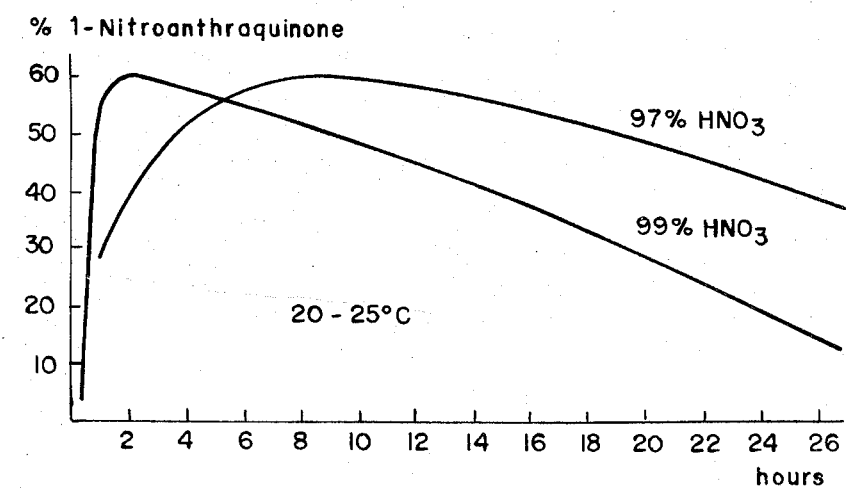

3,766,222
MANUFACTURE OF 1-NITROANTHRAQUINONE
Ernst Hartwig, Heidelberg, Otto Ackermann, Otterstadt, and Heinz Eilingsfeld, Frankenthal, Germany, assignors to Badische Anilin- & Soda-Fabrik Aktiengesellschaft, Ludwigshafen (Rhine), Germany
Filed Aug. 9, 1971, Ser. No. 170,222
Claims priority, application Germany, Aug. 11, 1970, P 20 38 822.5
Int. Cl. C09b 1/00
U.S. Cl. 260—369    4 Claims

ABSTRACT OF THE DISCLOSURE

Process for making 1-nitroanthraquinone in high yields by nitrating anthraquinone in heterogeneous phase in 70–90% w./w. sulfuric acid and in the temperature range 20° to 60° C. until 75% by weight of 1-nitroanthraquinone has formed. Washing of the isolated nitration product with carboxamides produces very pure 1-nitroanthraquinone.

---

This invention relates to an improved process for the manufacture and isolation of 1-nitroanthraquinone.

The nitration of anthraquinone does not produce α-nitroanthraquinone only, as β-nitration takes place along with the α-nitration. Under the usual conditions of nitration the ratio of α- to β-products obtained is about 10:1. Before the mononitration of the total amount of anthraquinone is complete, further nitration of the 1-nitroanthraquinone to 1,5- or 1,8-dinitroanthraquinones and to 2,5- or 2,6- or 2,8- or 2,7-dinitroanthraquinones commences, with the result that all of the products of presently known nitration processes are mixtures containing not more than 60 to 65% of 1-nitroanthraquinone. This is without doubt the reason why mercury sulfonation still constitutes the best route to 1-substituted anthraquinones. The advantage of mercury sulfonation is that the sulfonic acid is soluble in water and may therefore be separated from unreatced anthraquinone. This is not so in the case of nitration.

Nitrations known up to the present time may be characterized by the attached curve depicting nitration in 95–99% nitric acid plotted against time, the conditions being approximately those proposed by Graham and Hort (U.S. Pat. 2,874,168). It is seen that a maximum of only about 60% of 1-nitroanthraquinone can be achieved, at which stage dinitration commences and the yield of 1-nitroanthraquinone decreases.

The yields of pure α-derivative stated by Graham and Hort are certainly not obtainable in practice.

We have now found that 1-nitroanthraquinone may be produced from anthraquinone with good results when nitration of anthraquinone is carried out in heterogeneous phase in 70–90% and advantageously 75–82% sulfuric acid and at temperatures ranging from approximately 20° to about 60° C. until 1-nitroanthraquinone has formed to an extent of about 75% by weight. If desired, very pure 1-nitroanthraquinone may be isolated by washing the nitration product with carboxamides, after said nitration product has been washed with water and dried.

Nitration is advantageously carried out using a mixture of sulfuric acid of the stated concentration with from 20 to 30% by weight (based on sulfuric acid) of 90–100% nitric acid. The total initial water content of the nitration mixture should not exceed about 25% by weight. The amount of nitration mixture used in conveniently from 7 to 15 times and preferably from 8 to 12 times the weight of the anthraquinone.

The duration of nitration, i.e. the time taken until approximately 75% by weight of 1-nitroanthraquinone has formed, is dependent on the temperature at which nitration is carried out and the concentration of the nitration mixture and is from about 12 to 15 hours at the preferred temperature of about 40° C. There is obtained a nitration product containing 75.3% of 1-nitroanthraquinone, 4.3% of 1,5-dinitro compounds, 4.1% of 1,8-dinitro compounds, approximatley 7% of β,α-dinitro compounds, 7% of 2-nitroanthraquinone and a few percent of anthraquinone. In the process of the invention it is thus possible, surprisingly, to nitrate the anthraquinone almost completely before the yield of 1-nitroanthraquinone is diminished by dinitration. The yields given above are averages of a large number of experiments.

If the nitration is stopped after 8 hours when carried out at 40° C., the mixture contains only a few percent of dinitro compounds but still contains approximately 15–20% of anthraquinone.

The end product of the nitration may be determined during the process by analyzing aliquots. The nitration time, once determined for given apparatus and given conditions, may then be used in repeat runs without redetermination.

Before nitration, the anthraquinone is conveniently converted to a finely divided form by milling and screening. It may be added to the sulfuric acid followed by the nitric acid, or alternatively the nitration mixture may be prepared before the anthraquinone is added.

The carboxamides used for isolating the 1-nitroanthraquinone by washing the nitration product should have good dissolving power and should be liquid at the operating temperatures, i.e. temperatures ranging from about 0° to 40° C. Preferred carboxamides are, in particular, formamides and mixtures thereof. The amides may be substituted by one or two alkyl groups on the nitrogen atom, and the amide groups may be members of a heterocyclic ring. Suitable solvents for removing impurities from the nitration product are, for example, formamide, dimethyl formamide, diethyl formamide, formylpiperidine, formylmorpholine, N-methylpyrrolidone, dimethylacetamide and dimethylpropionamide. The most convenient amount of solvent to be used depends to a large extent on the dissolving power of the amide. The optimum quantity is that which leaves from 50 to 70% by weight of the residue undissolved. In the case of dimethyl formamide, the optimum quantity is from 10 to 14 times the weight of the nitration product, and in the case of N-methylpyrrolidone it is from 3 to 4 times the said weight.

Before the wash with carboxamides, the nitration product is freed from water. This may be done by drying or by washing with lower alcohols or ketones. Suitable alcohols for this purpose are, for example, methanol and isopropanol and a suitable ketone is acetone.

If the thus prepared nitration product is washed with, say, from 5 to 15 times its weight of dimethyl formamide at temperatures of from 0° to 40° C. and preferably from 15° to 25° C., the residue consists of from 94 to 96% of 1-nitroanthraquinone, from 1 to 1.3% of 1,5- and 1,8-dinitroanthraquinones and a few percent of anthraquinone. The residue is virtually free from 2-nitro compounds and contains no 2,6-dinitro compounds. Advantageously, the residue is gently stirred, shaken or vibrated during washing. The yield is approximately from 50 to 60%. The filtrate may be concentrated, recovering the solvent if desired, or the dinitro compounds may be precipitated with water. The crude nitro compounds obtained from the filtrate may be further processed to form dinitro compounds.

The 1-nitroanthraquinone obtained in the present invention gives 1-aminoanthraquinone by normal reduction, say with sodium sulfide.

Our new process enables pure α-aminoanthraquinone to be prepared without mercury sulfonation, and the nitration and washing stages present no technical difficulties. The processes of nitration and/or washing may be carried out continuously or, for example, according to the following scheme:

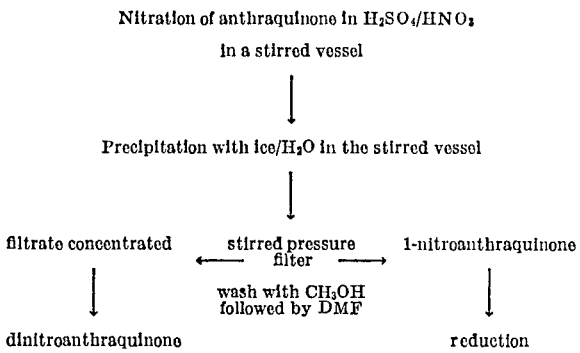

In the following examples the parts are by weight.

EXAMPLE 1

20.8 parts of screened and ground anthraquinone are added to 160 parts of 78% sulfuric acid. 51 parts of 98% nitric acid are then added at room temperature, the temperature rising to 40° C. The mixture is stirred at this temperature for from 12 to 15 hours. The nitration mixture is poured into 1,000 parts of a mixture of ice and water and the precipitate is filtered off. The residue is dried and stirred with 200 parts of dimethyl formamide at room temperature. The solid material is filtered off and dried.

The yield is 11 parts of 1-nitroanthraquinone, M.P. 220–224° C.; purity 95–96%.

EXAMPLE 2

Nitration is carried out as described in Example 1 and the moist nitration mixture is placed on a suction filter and washed with about 120 parts of methanol and then with 200 parts of dimethyl formamide. 1-nitroanthraquinone of the same degree of purity is obtained in the same yield.

EXAMPLE 3

Example 1 is repeated except that 70 parts of N-methylpyrrolidone are used in place of the 200 parts of dimethyl formamide. There are obtained 9.8 parts of 1-nitroanthraquinone.

We claim:

1. A process for the manufacture of pure 1-nitroanthraquinone from anthraquinone which comprises nitrating the anthraquinone in heterogeneous phase in 70–90% sulfuric acid, said sulfuric acid containing from 20 to 30% of its weight of 90 to 100% nitric acid such that the total initial water content of the nitration mixture does not exceed approximately 25% by weight, said nitration being carried out at a temperature of from approximately 20° C. to about 60° C. until 75% by weight of 1-nitroanthraquinone has formed, and washing the nitration product with a carboxamide selected from the group consisting of formamide, N,N-dimethyl formamide, N,N-diethyl formamide, N-formylpiperidine, N-formylmorpholine, N-methylpyrrolidone, N,N-dimethylacetamide, N,N-dimethylpropionamide and mixtures thereof after said nitration product has been first washed neutral with water and then freed from water.

2. A process as claimed in claim 1 wherein the nitration product is washed with said carboxamide for a period of time such that from 50 to 70% by weight with reference to the original unwashed product remains undissolved.

3. A process as claimed in claim 1 wherein the initial nitration product is added to water, washed until neutral and then dried to remove the water and thereafter the water-free product is washed with N,N-dimethyl formamide or N-methylpyrrolidone.

4. A process as claimed in claim 1 wherein the initial nitration product is added to water, washed until neutral and the water then displaced by a water-miscible solvent to remove the water and thereafter the water-free product is washed with N,N-dimethyl formamide or N-methylpyrrolidone.

References Cited
UNITED STATES PATENTS
2,302,729   11/1942   Whelen _____ 260—369

LORRAINE A. WEINBERGER, Primary Examiner

E. J. SKELLY, Assistant Examiner